Figure 1:
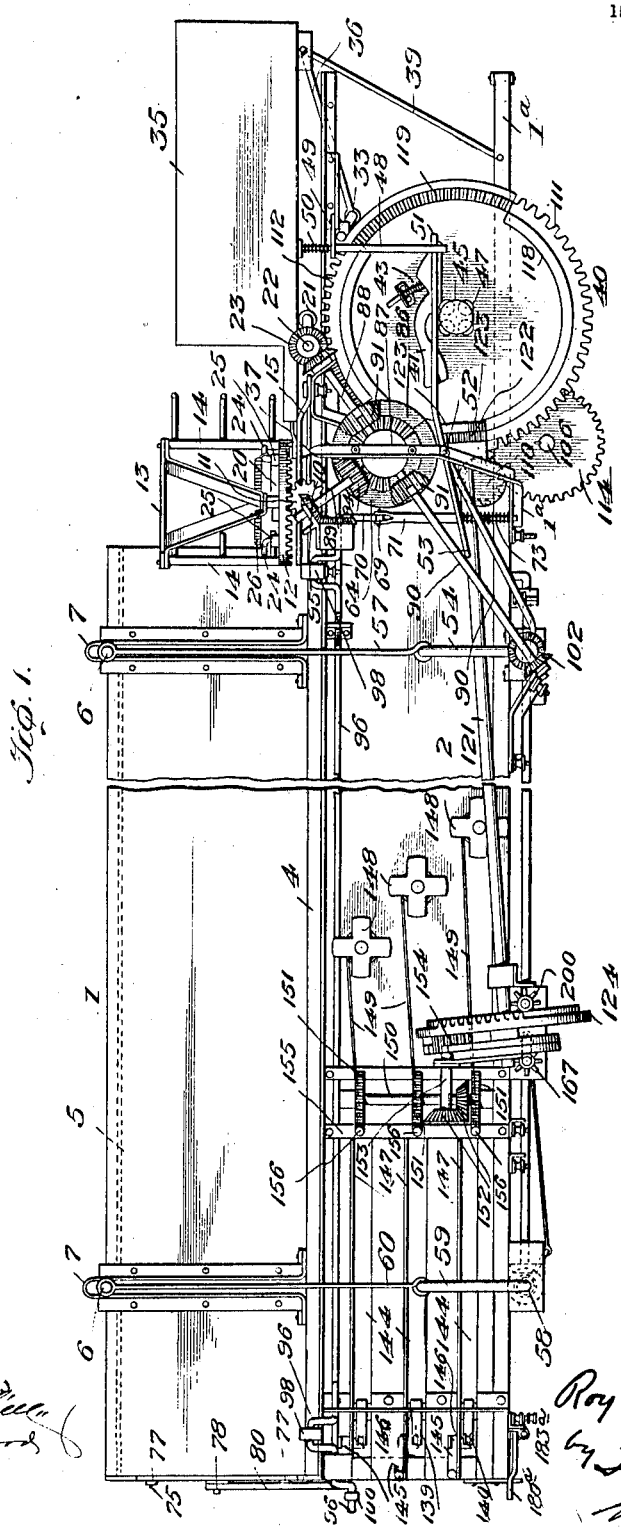

R. A. COLLINS.
AUTOMATIC BALING MACHINE.
APPLICATION FILED JAN. 11, 1912.

1,040,278.

Patented Oct. 8, 1912.
15 SHEETS—SHEET 1.

R. A. COLLINS.
AUTOMATIC BALING MACHINE.
APPLICATION FILED JAN. 11, 1912.

1,040,278.

Patented Oct. 8, 1912.
15 SHEETS—SHEET 2.

R. A. COLLINS.
AUTOMATIC BALING MACHINE.
APPLICATION FILED JAN. 11, 1912.

1,040,278.

Patented Oct. 8, 1912.
15 SHEETS—SHEET 5.

Witnesses

Inventor
Roy A. Collins
By
his Attorney

R. A. COLLINS.
AUTOMATIC BALING MACHINE.
APPLICATION FILED JAN. 11, 1912.

1,040,278.

Patented Oct. 8, 1912
15 SHEETS—SHEET 6.

R. A. COLLINS.
AUTOMATIC BALING MACHINE.
APPLICATION FILED JAN. 11, 1912.

1,040,278.

Patented Oct. 8, 1912.
15 SHEETS—SHEET 7.

R. A. COLLINS.
AUTOMATIC BALING MACHINE.
APPLICATION FILED JAN. 11, 1912.
1,040,278.
Patented Oct. 8, 1912.
15 SHEETS—SHEET 8.
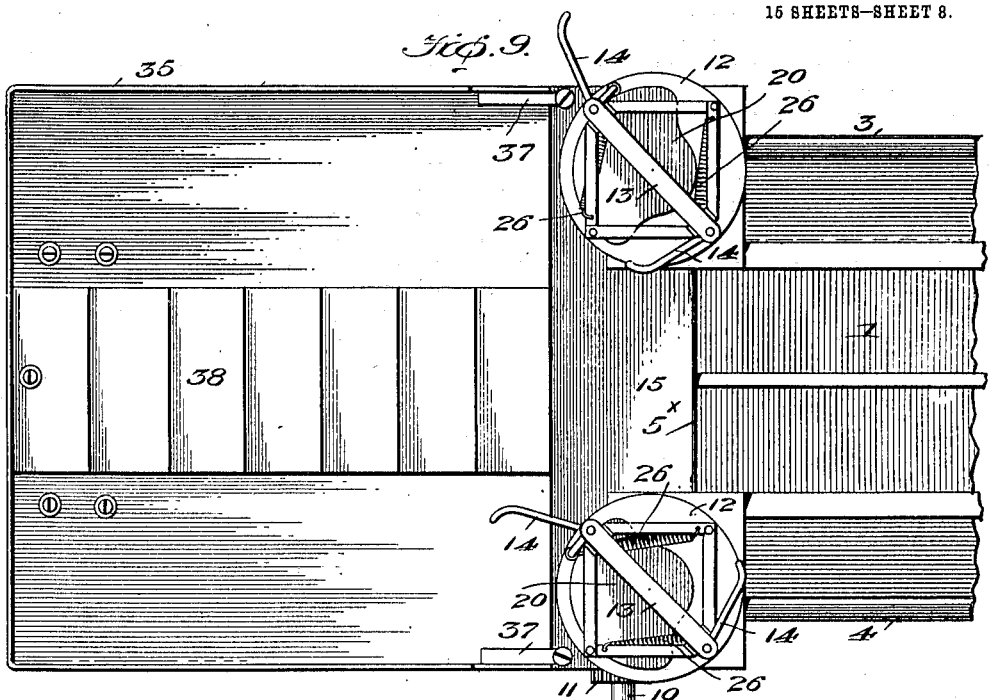
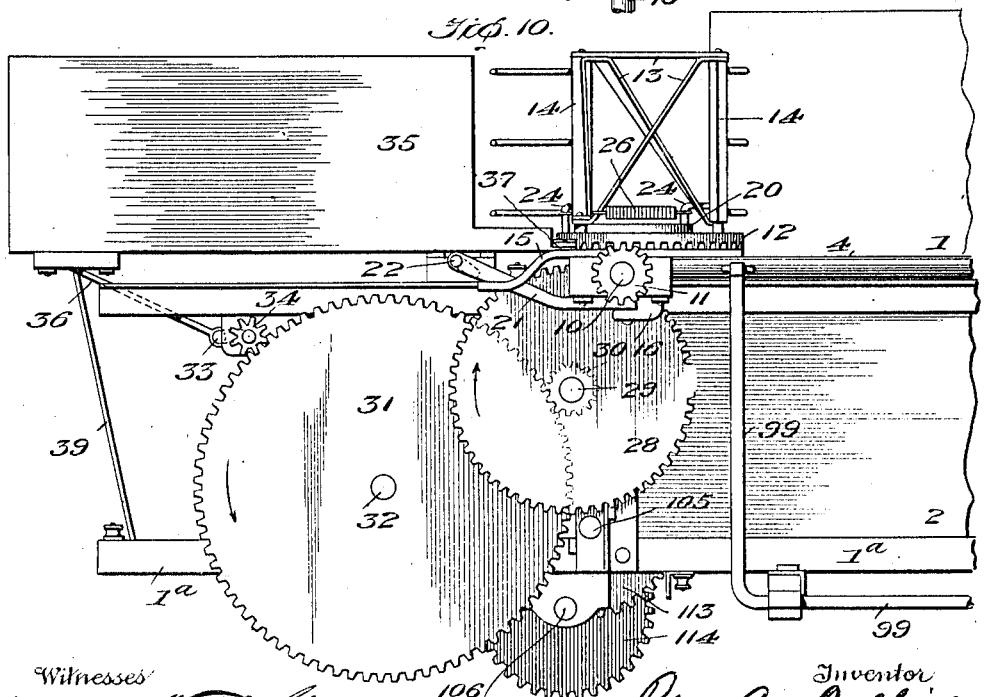

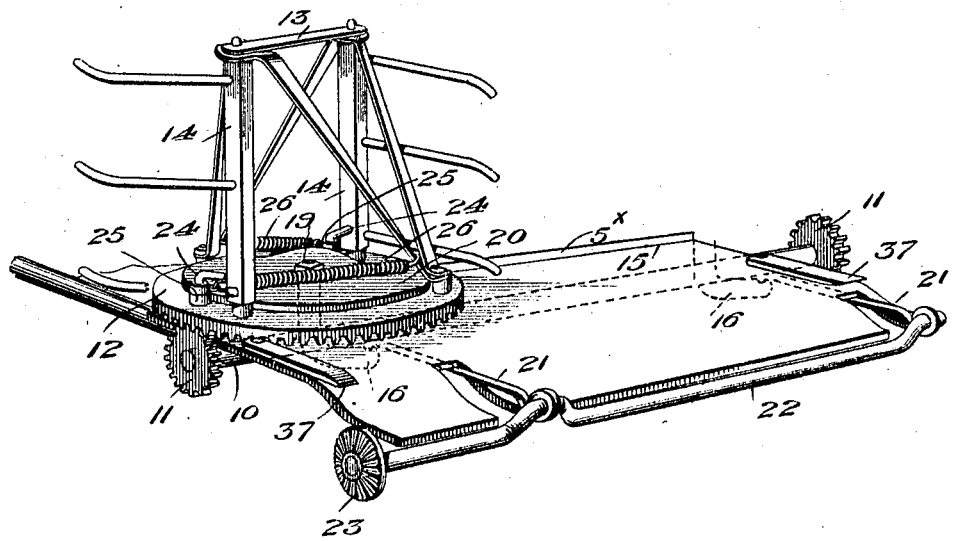
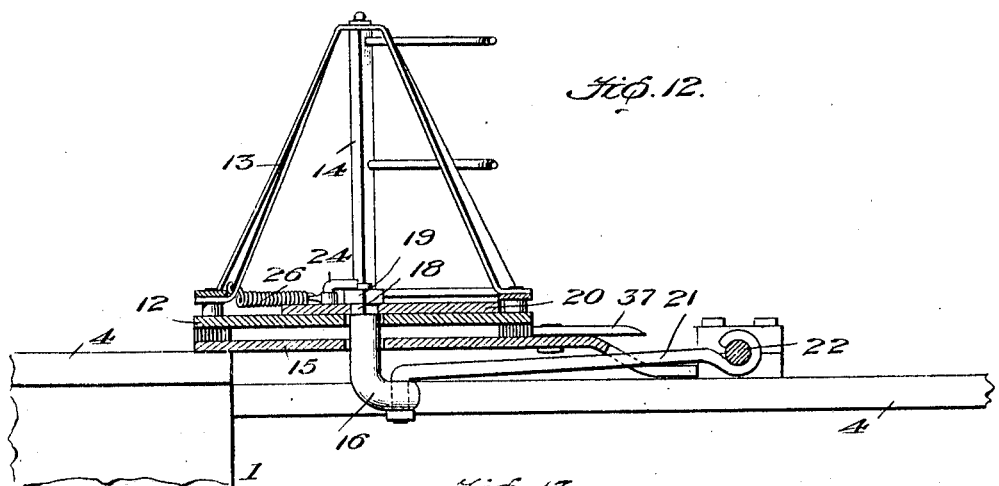
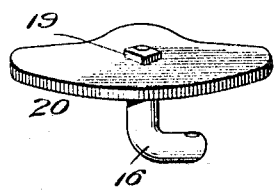

R. A. COLLINS.
AUTOMATIC BALING MACHINE.
APPLICATION FILED JAN. 11, 1912.
1,040,278.
Patented Oct. 8, 1912.
15 SHEETS—SHEET 10.
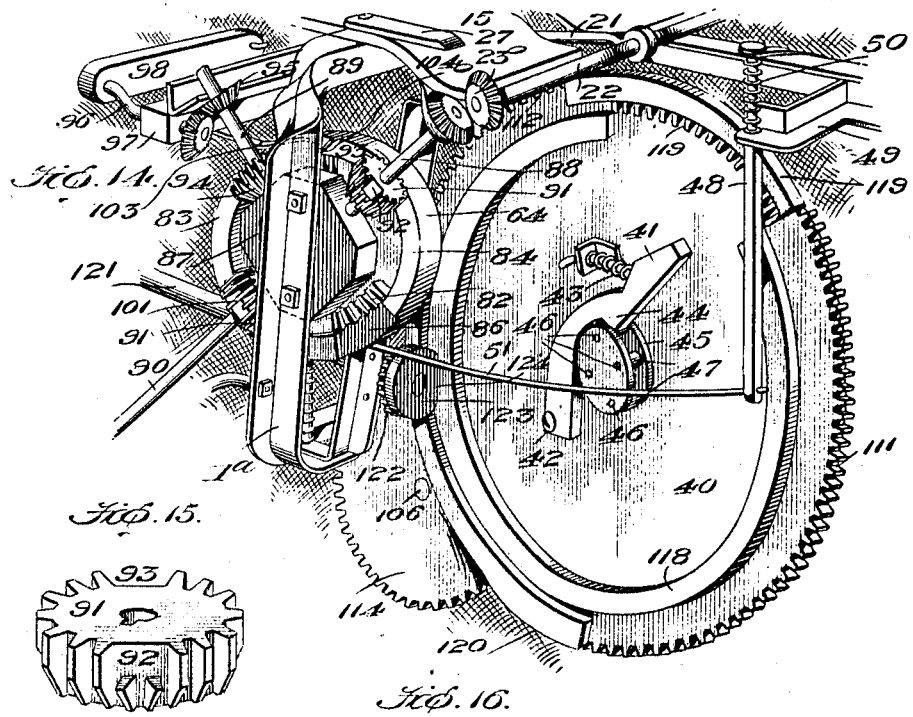
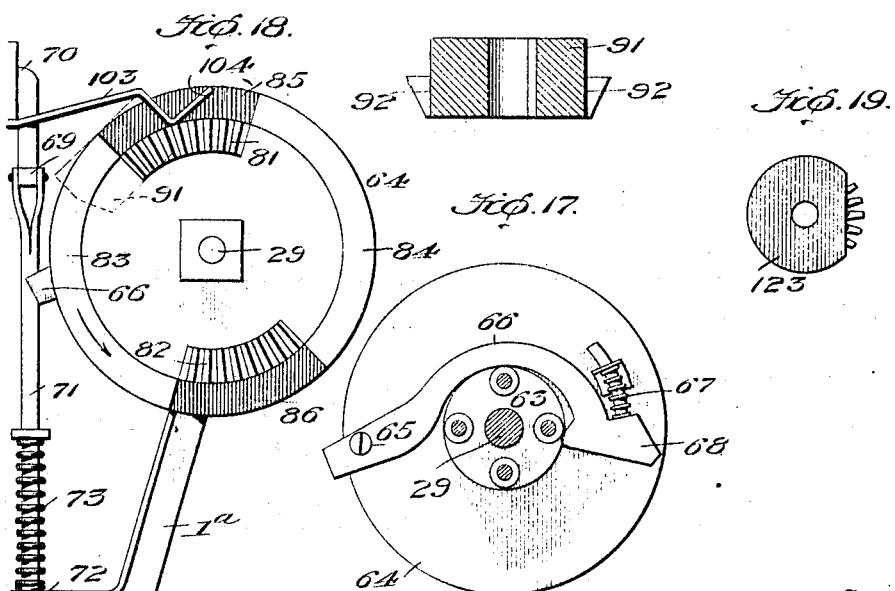
Witnesses
Inventor
Roy A. Collins
by his Attorney R. A. COLLINS.
AUTOMATIC BALING MACHINE.
APPLICATION FILED JAN. 11, 1912.
1,040,278.
Patented Oct. 8, 1912.
15 SHEETS—SHEET 11.
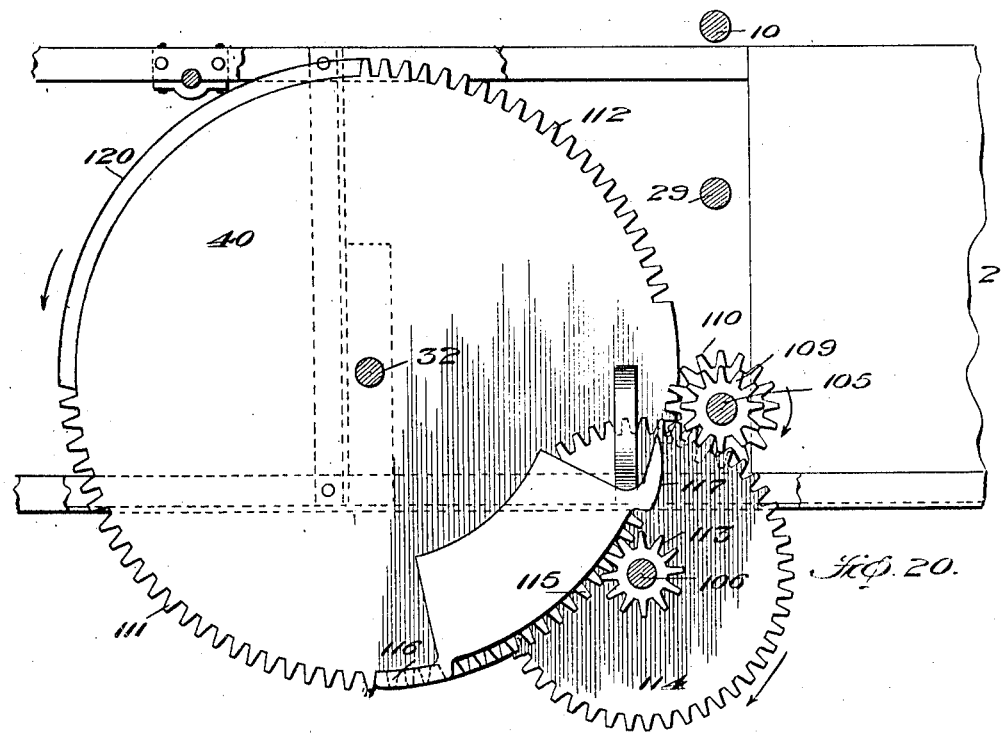
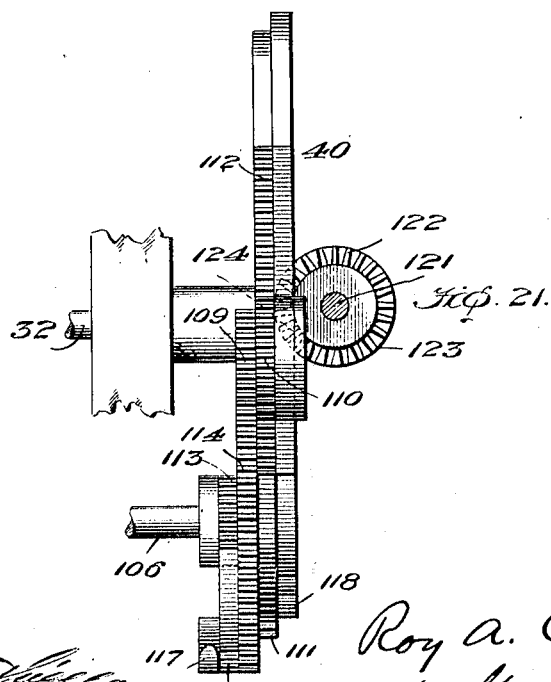
Witnesses
Inventor
Roy A. Collins
by his Attorney

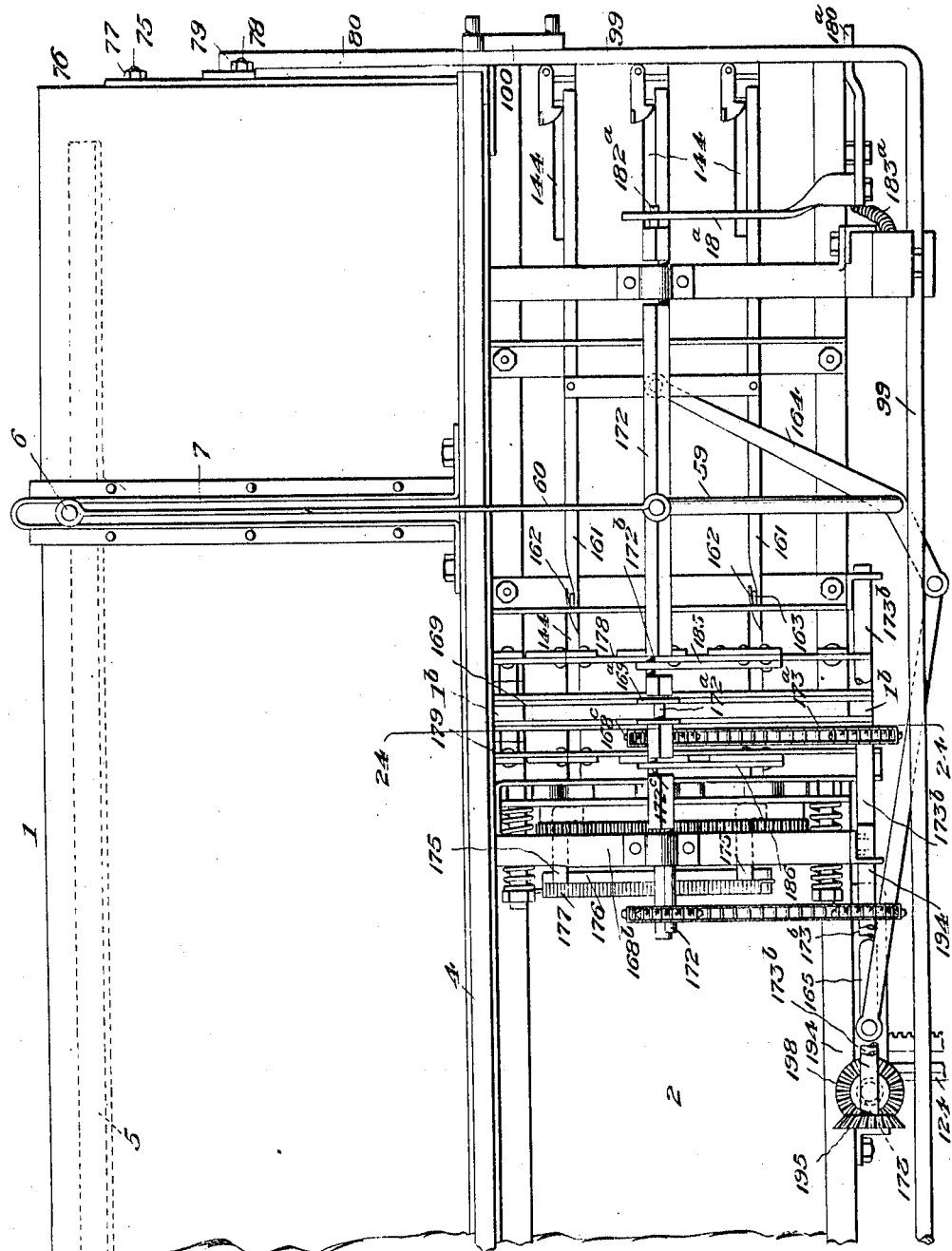

R. A. COLLINS.
AUTOMATIC BALING MACHINE.
APPLICATION FILED JAN. 11, 1912.
1,040,278.
Patented Oct. 8, 1912.
15 SHEETS—SHEET 13.
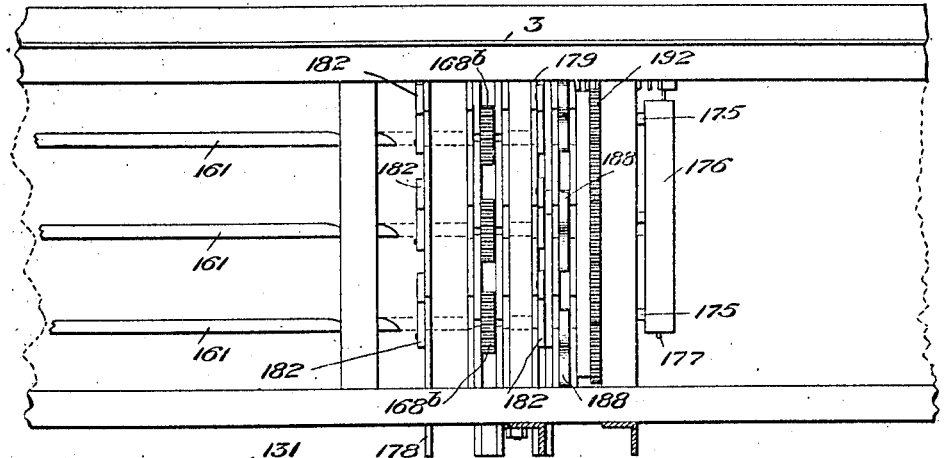
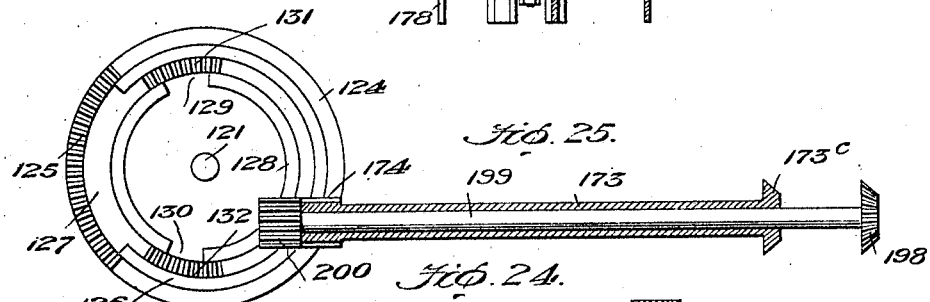
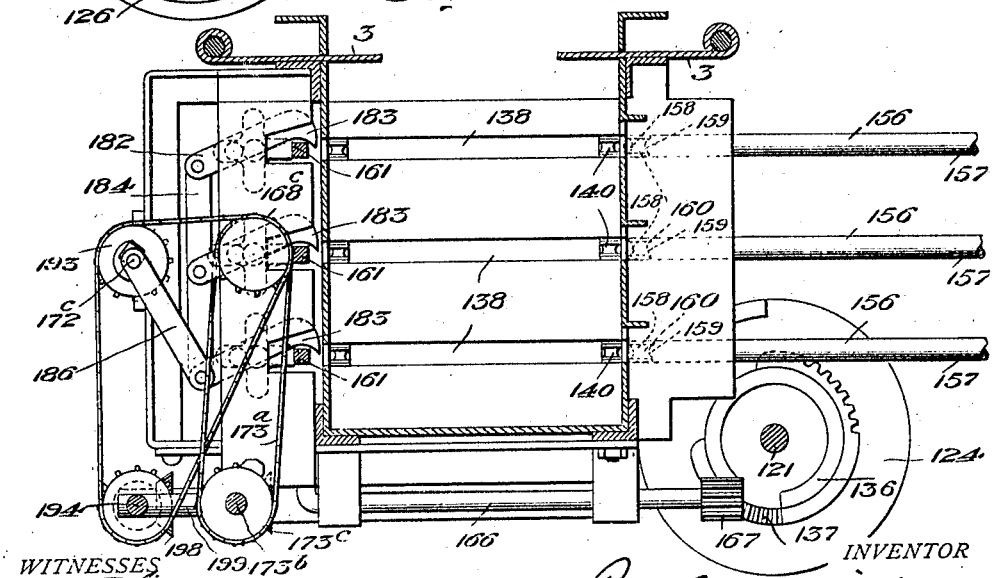

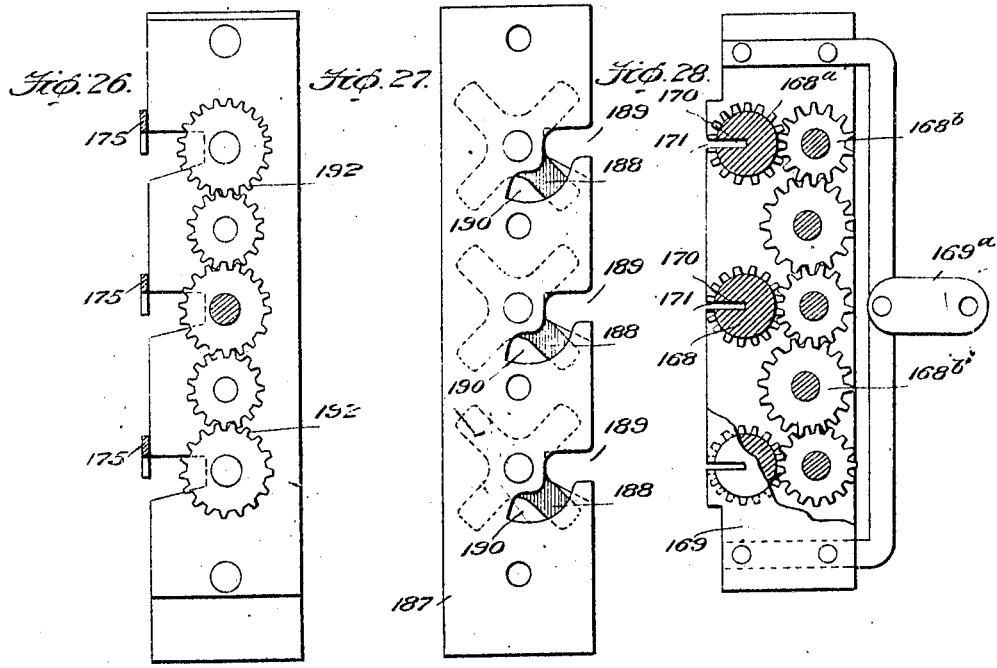
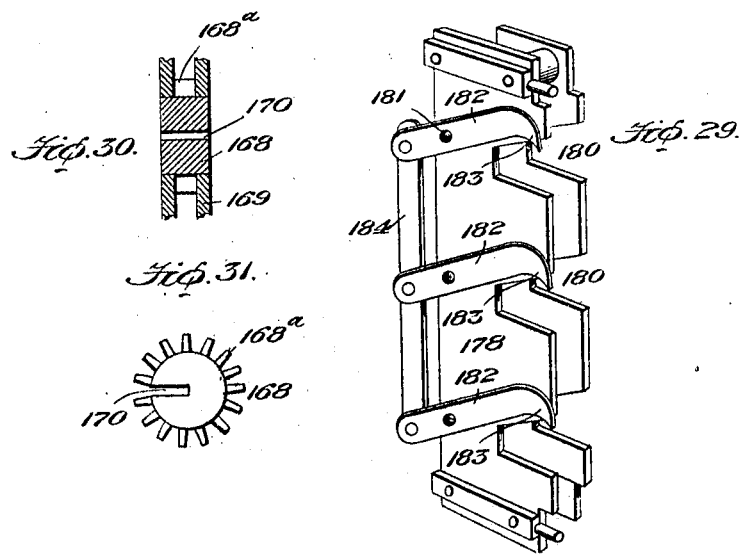

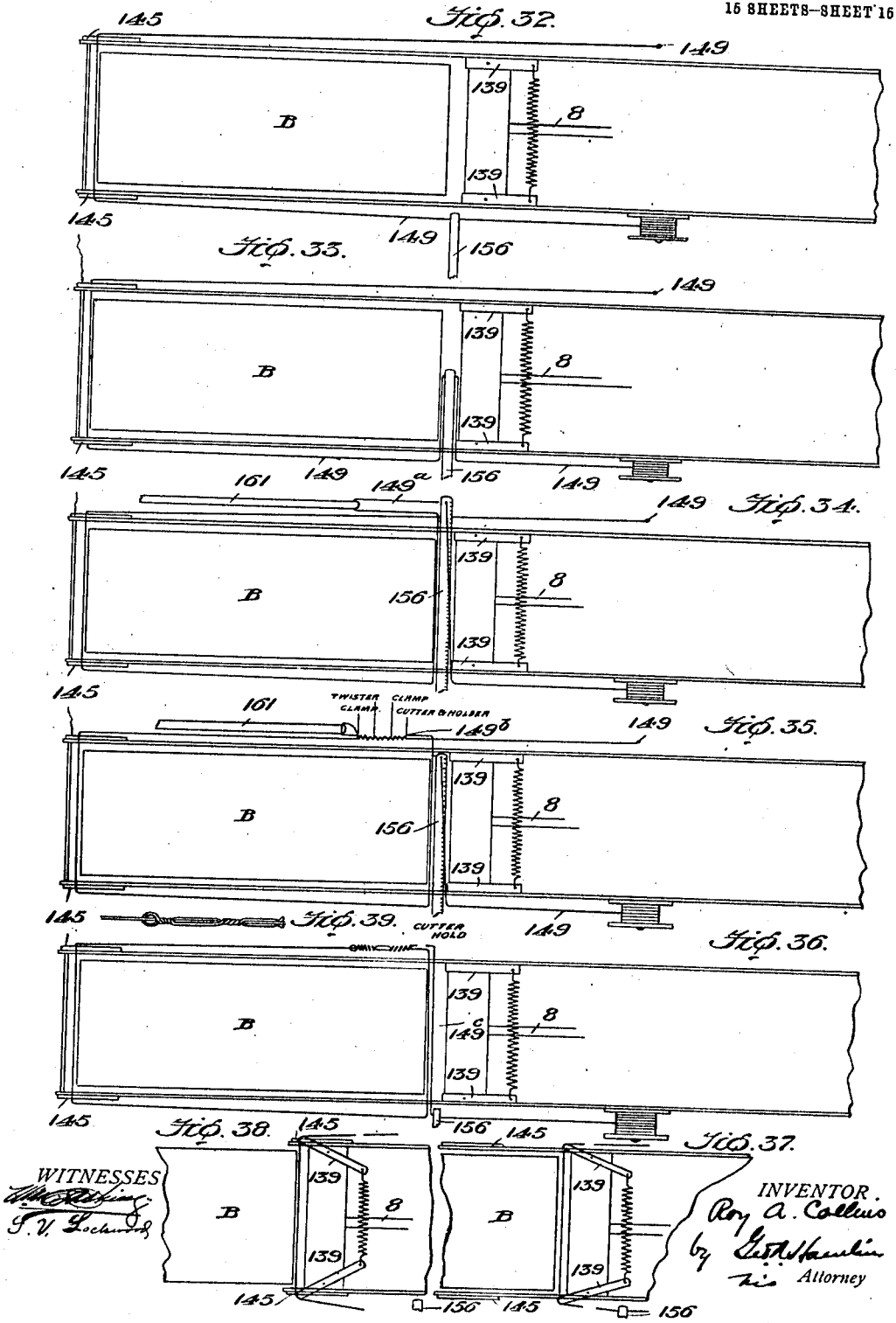

UNITED STATES PATENT OFFICE.

ROY A. COLLINS, OF GERSTER, MISSOURI.

AUTOMATIC BALING-MACHINE.

1,040,278.  Specification of Letters Patent.  Patented Oct. 8, 1912.

Application filed January 11, 1912. Serial No. 670,723.

*To all whom it may concern:*

Be it known that I, ROY A. COLLINS, a citizen of the United States, residing at Gerster, county of St. Clair, and State of Missouri, have invented certain new and useful Improvements in Automatic Baling-Machines, of which the following is a specification.

This invention relates to automatic baling machines.

The invention has for its objects the provision of a new machine, embracing new mechanisms and devices, adapted to automatically feed the materials such as hay, into a baling chamber, condense or pack it in said chamber, compress the hay into the form of a bale, and while retaining the bale under compression, tie or wire it, and finally automatically eject the completed bale and resume the series of operations set forth.

In carrying out my invention I provide a baling chamber having novel gates adapted to sub-divide it into upper and lower parts in the lowermost of which the compressing or bale forming plunger operates, and a condensing top, whereby the hay may be fed into the baling chamber and subsequently forced by the movable top into the lower part thereof for subsequent compression by the baling plunger.

I also provide novel feeding mechanism consisting of forks adapted to pass the hay into the baling chamber and which are retracted and projected in a new manner; further, a new self-feeding hopper which agitates the hay and delivers it to the feeders.

The invention consists, further, in automatic means operated by the pressure of the hay forced into the upper part of the baling chamber whereby when the desired or predetermined density of the hay fed into the chamber is obtained, the movable top is brought into operation and the feed stopped to permit forcing of the hay in the baling chamber.

There is also provided in carrying out the invention, novel gearing and means coöperating with the baling plunger by which said plunger is run into the baling chamber to compress the hay therein and to form the bale, is maintained while the bale is being wired or bound, then made to automatically eject the bale, and finally is retracted to its normal position ready for refilling of the baling chamber for a repetition of these operations.

Another part of the invention consists in a new binding or tying mechanism adapted for automatic operation, embracing needles, twisters, and cut-off mechanism by which the bale is bound or tied while it is being held under compression by the baling plunger, such mechanism embodying parts and mechanisms which are timed to carry out their purpose in conjunction with the other operative parts of the machine, and the plunger is provided with new devices adapted to coöperate with the binding or tying mechanism to effect the binding of the bale.

The invention embodies mechanisms, combinations of parts, and elements as set forth more fully hereinafter but the subjoined description is to be deemed as illustrative, rather than restrictive, of the invention and I do not limit myself to the precise details appearing hereinafter.

Figure 2:
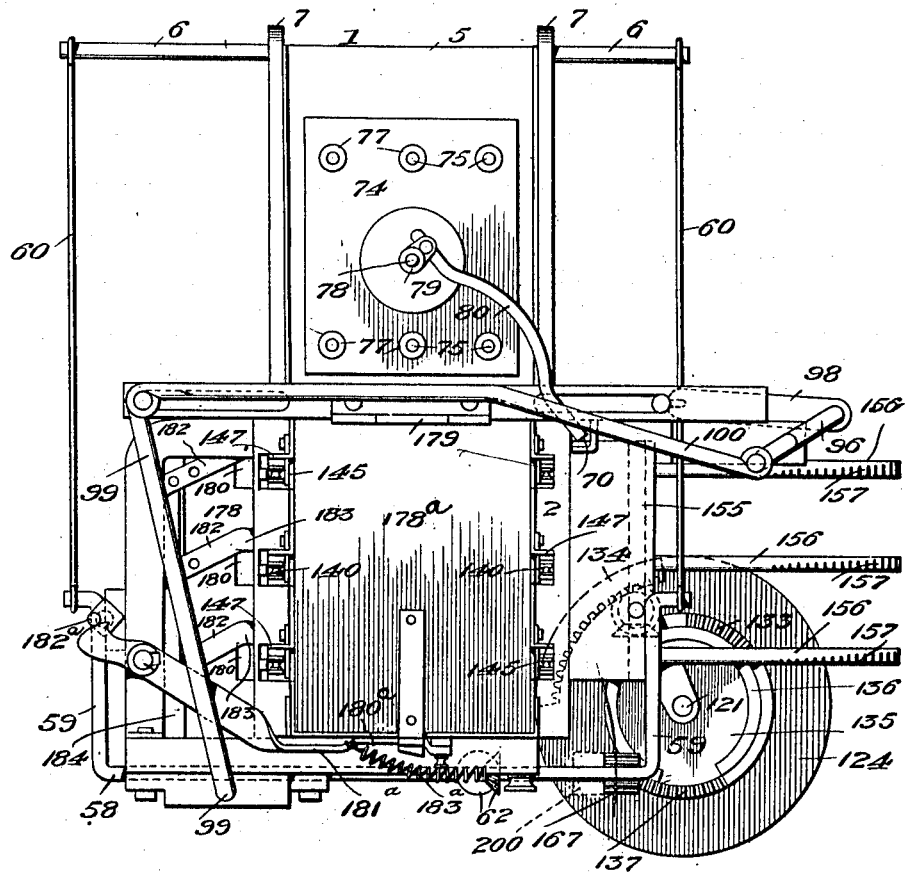
Figure 3:
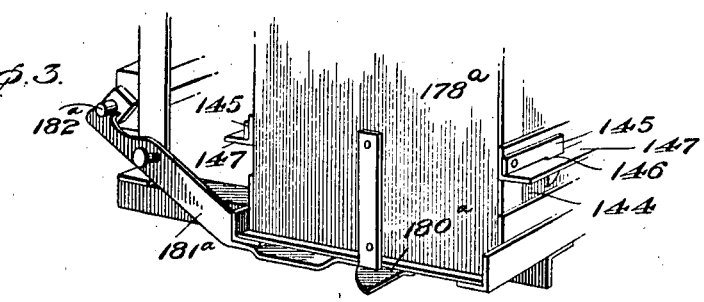
Figure 4:
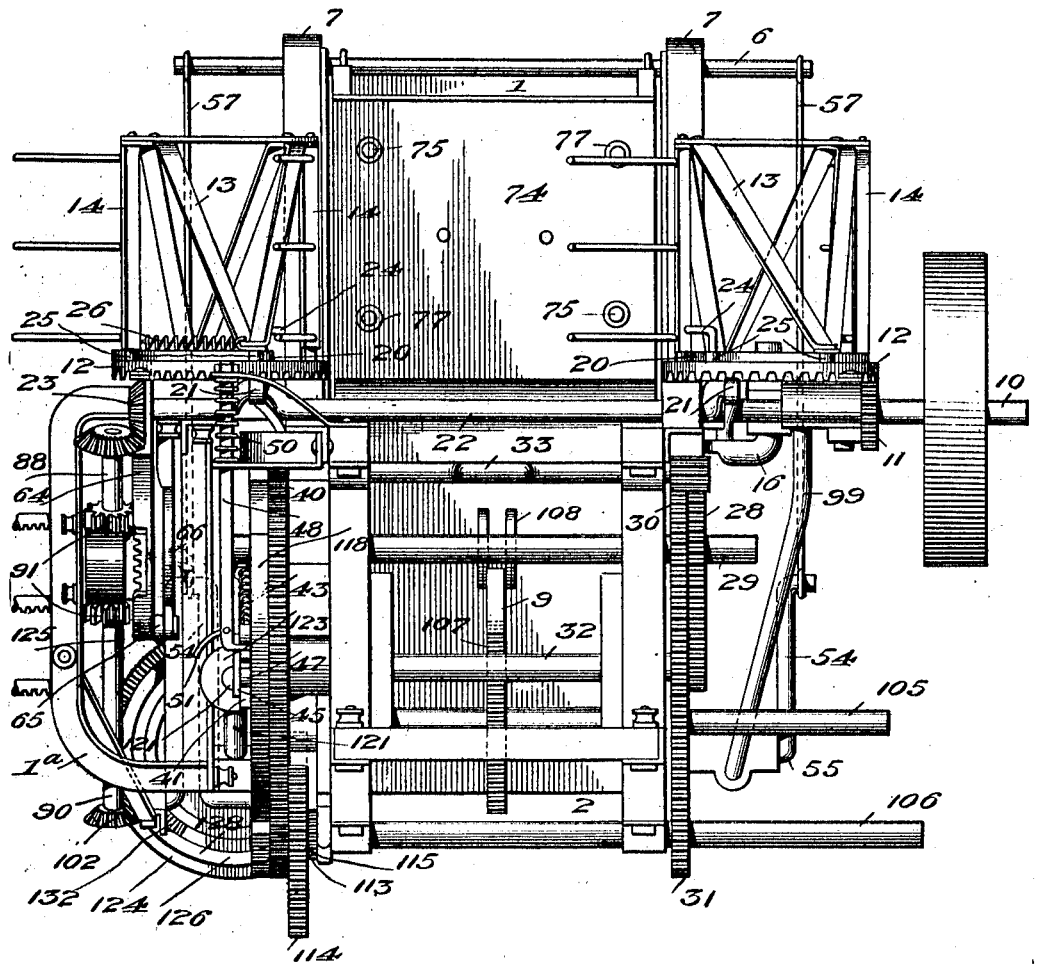
Figure 5:
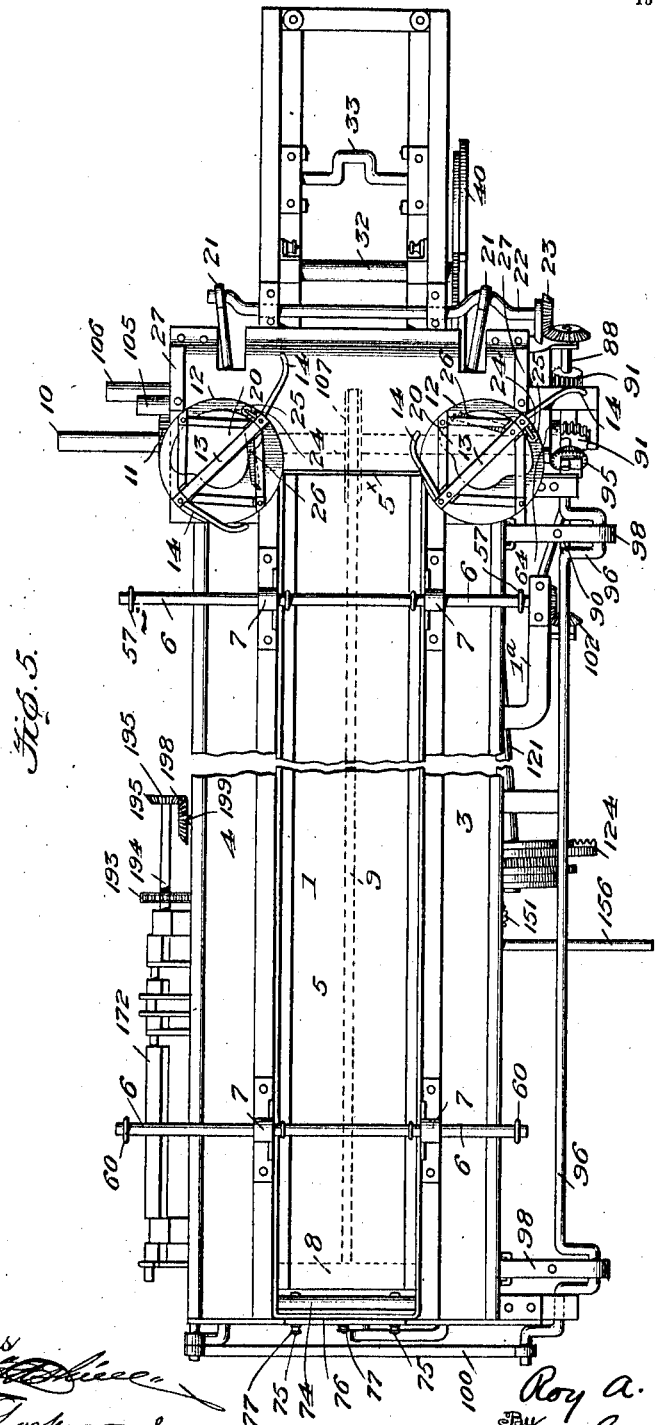
Figure 6:
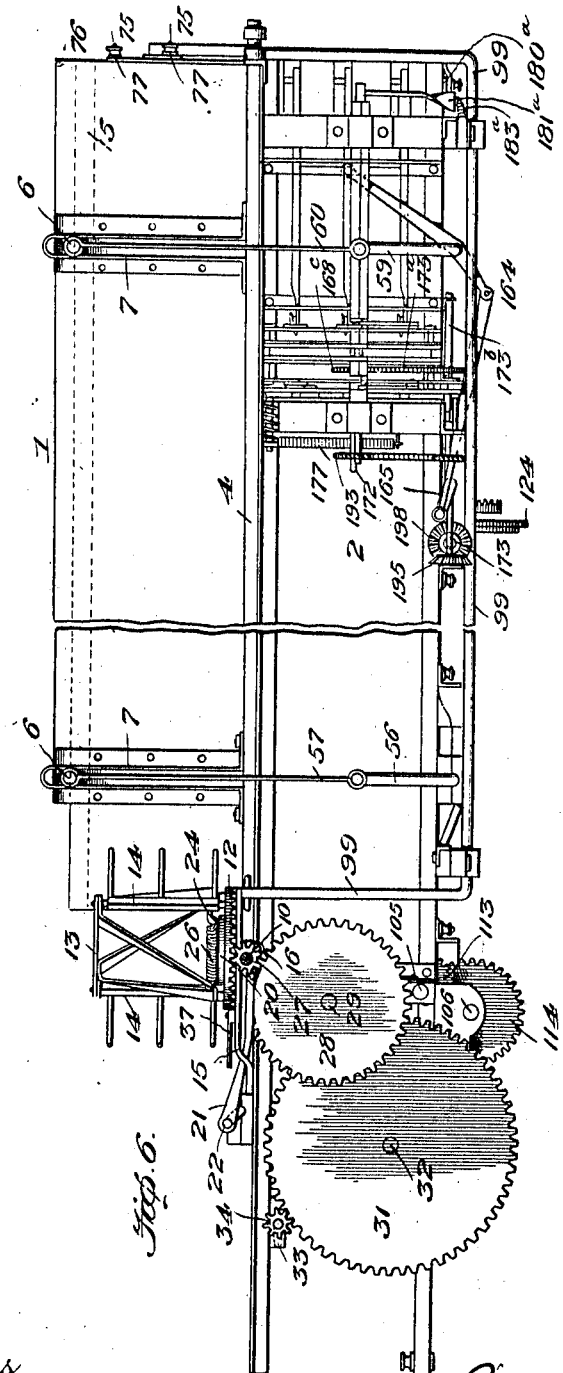
Figure 7:
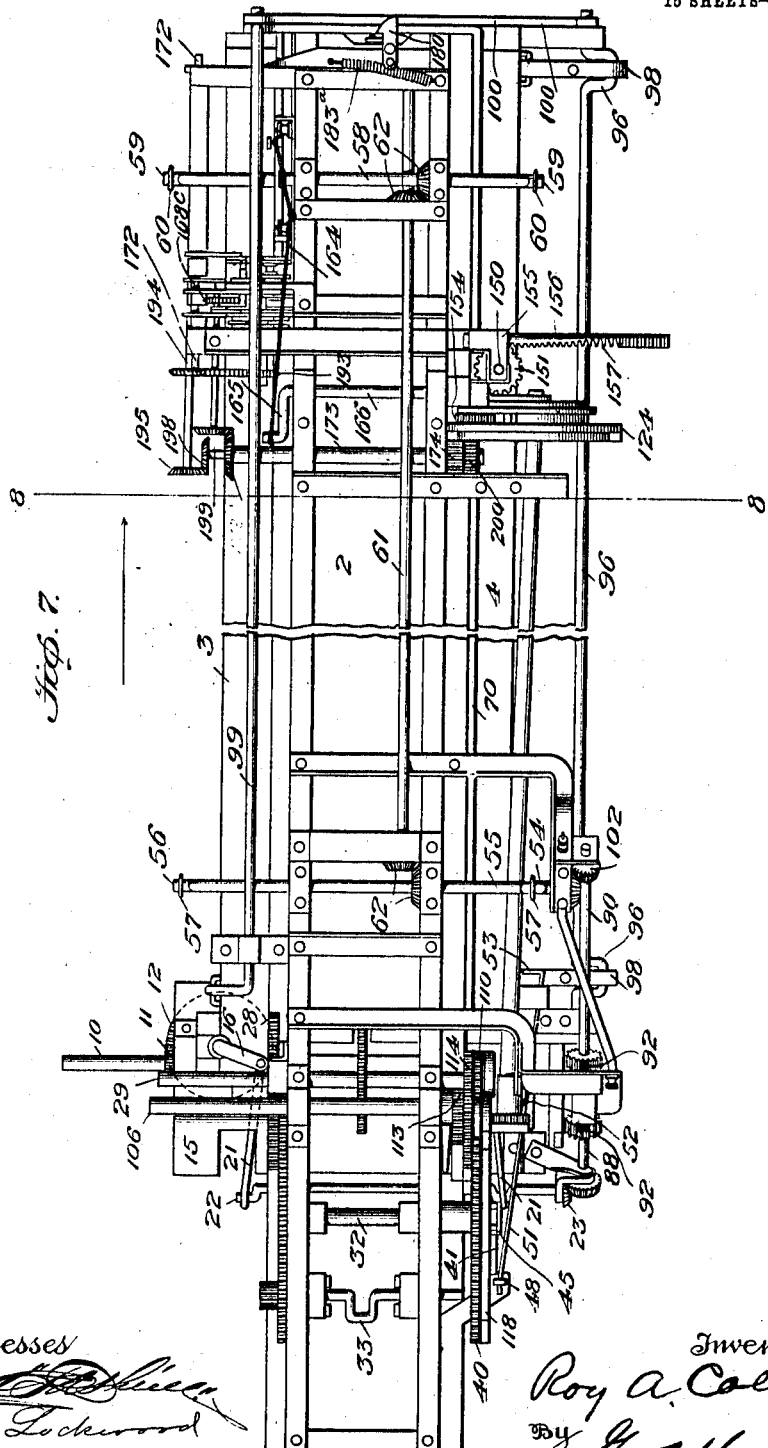
Figure 8:
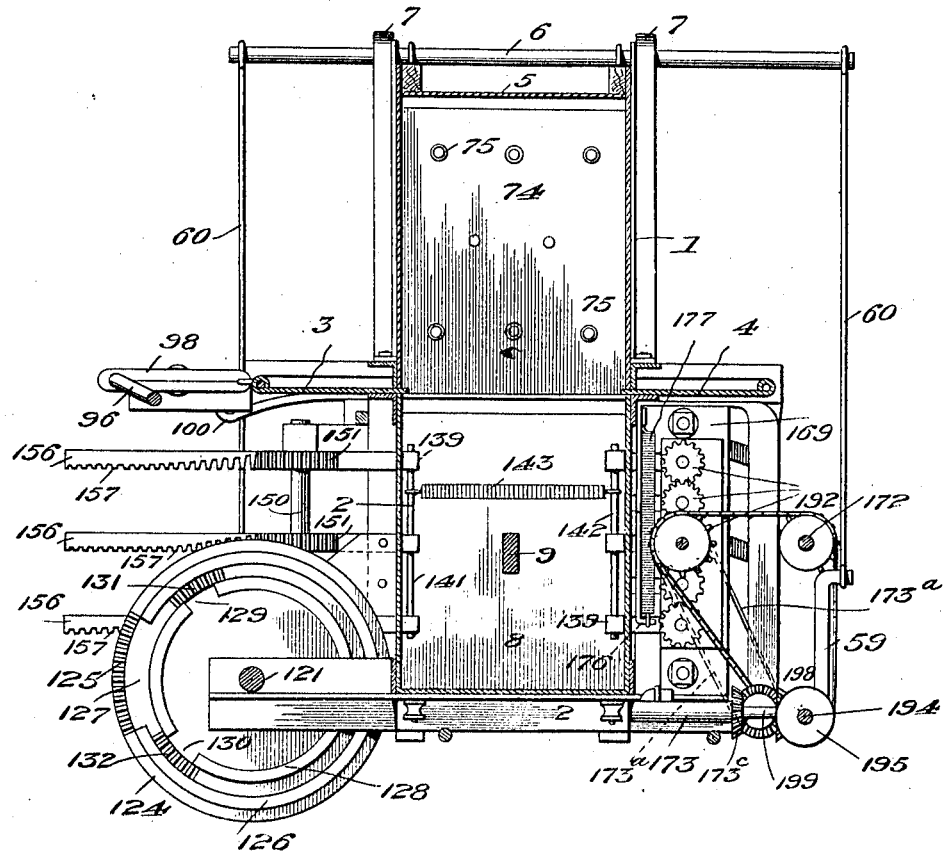

In the accompanying drawings: Figure 1 is a side elevation of the complete machine, the baling chamber being shown broken and the support or truck for the machine being omitted; Fig. 2, an end elevation of the machine where the bale is ejected; Fig. 3, a detail perspective of the parts at the lower end of Fig. 2, showing one of the wire clamping hooks and the latch for the gate of the baling chamber; Fig. 4, an elevation of the receiving end of the machine, the hopper being omitted; Fig. 5, a plan, the hopper being omitted; Fig. 6, a side elevation taken opposite to Fig. 1; Fig. 7, a bottom plan; Fig. 8, a cross-section on line 8—8, Fig. 7; Fig. 9, a detail plan of the hopper showing its relation to the feeders; Fig. 10, a side elevation thereof; Fig. 11, a detail perspective of one of the feeders and associated parts; Fig. 12, a vertical section therethrough; Fig. 13, a detail of a cam of Figs. 11 and 12; Fig. 14, a detail perspective of certain gears and devices for operating the plunger, presser, gates, baling mechanism, etc.; Fig. 15, a detail of one of the gears of the set shown in Fig. 14; Fig. 16, a vertical section through Fig. 15; Fig. 17, a detail of a latching mechanism for one of the gears; Fig. 18, a detail of certain devices used for latching the gearing; Fig. 19, a detail of a certain pinion; Fig. 20, an inside detail face view of the devices for operating the plunger; Fig. 21, an edge view looking toward the left hand edge of the gearing of Fig. 14; Fig. 22, is an enlarged side elevation of the bale wiring mechanism; Fig. 23, a side elevation of the bale wiring twisting mechanism, looking from the interior of the baling chamber; Fig. 24, a cross-section on line 24—24, Fig. 22; Fig. 25, a detail of the inner and outer shafts which drive the twisting wire and cutting mechanism; Fig. 26, a detail view of one side of the cutting mechanism; Fig. 27, a similar view of the other side thereof; Fig. 28, a detail side view of the twisting mechanism; Fig. 29, a detail perspective of one of the wire clamping mechanisms; Fig. 30, a detail cross-section of one of the twisting wheels; Fig. 31, a face view thereof; Fig. 32, a diagram showing the arrangement of one of the wires for the first bale; Fig. 33, a similar view showing the first movement of a crosswise-operating needle; Fig. 34, a similar view showing the crosswise-operating needle in position after it has carried the wire to the opposite side of the baling chamber and a looping needle after it has caught the wire and formed the loop; Fig. 35, a diagram illustrating the operation of the clamp, twister, and cutter; Fig. 36, a similar view showing the bale completely wired, the loose end of the wire severed and held by the cutter, and the crosswise-operating needle retracted; Fig. 37, a diagram showing the plunger carrying the wire forward while ejecting the previously wired bale; Fig. 38, a view showing the wire pressed by the plunger into engagement with the catches and the wired bale completely ejected; and Fig. 39, a view of the twist formed in wiring the bale.

The machine will be suitably supported on a wheeled truck, by preference, so that it may be readily moved from place to place according to conditions of use, but it may be stationarily supported in any desired manner.

The baling box or chamber is composed of an upper receiving chamber 1 and a lower compression chamber 2 having the same side walls, closed at the compression end by a gate hereinafter described, open at the other end, and having an open top. The baling box is subdivided into the aforesaid chambers by the horizontally movable gates 3 and 4 which are adapted to slide through slots in the walls thereof, these gates being normally closed while the hay is being fed into the receiving chamber and being adapted to automatically separate or open to permit the hay to be condensed into the compression chamber below said gates at a certain time for subsequent compression by the plunger into a bale.

Condensing of the hay and its passing into the compression chamber is accomplished by a vertically movable top or compressor 5 carried by cross bars 6 sliding in vertical guides 7, the parts being so timed and related in their operation that this compressing top does not interfere with the horizontally movable gates. The plunger 8 is movable in the compression chamber and suitably fits it, being provided with a rack 9 which is operated at certain times as will more fully appear hereinafter.

Extending across the machine at the receiving end thereof, is a drive shaft 10 which is provided with a suitable belt pulley or other means for its rotation from a suitable motor. This shaft has pinions 11 which mesh with horizontal gear tables 12 of the feeders, Figs. 9, 10 and 11. Rising from the gear tables are frames 13 to which and to the gear tables are pivoted the rockable forks 14 whose tines are preferably curved so that they may more readily withdraw from the hay and clear the top compressor when it is descending or ascending. Passing centrally upward through the platform 15 on which the gear tables are supported are the cranks 16 which pass loosely through the gear tables at 17 and are provided with squared parts 18 disposed above the gear tables. Engaged with the squared parts 18 and held on the cranks by nuts 19 are cams 20 which are thus held stationary or shifted according as the cranks are turned. The cranks 16 are connected by pitmen 21 to a crank shaft 22 which is provided with a gear 23 which, at a predetermined time, is turned by mechanism to be described hereinafter to thereby shift the cams. The forks 14 are provided with arms 24 having rollers 25 maintained in engagement with the cams by springs 26. The cams 20 are normally maintained in such position that the forks are extended outwardly from the gear tables, against the retracting action of the springs, until the forks have engaged the hay and forced it toward the upper or receiving chamber of the baling box, but they are so arranged that they are allowed to retract or fold and thus to be out of position where they would be struck by the compressing cover or top and are also by this retracting action drawn out from the hay so that they clear it and do not interfere with its deposit in the receiving chamber above the sliding gates. These alternate extensions and retractions of the forks continue until a certain cycle of operations has been undergone, whereupon the hay passed into the receiving chamber is forced downwardly into the compression chamber, whereupon the shaft 22 is turned so that the forks will be retracted when in position for feeding, and hence will not feed the hay into the receiving chamber while the compressing top is descending.

The shaft 10 is provided with a pinion 27 which meshes with a gear 28 on a shaft 29. Immediately next the gear 28 is a pinion 30, secured to shaft 29, which meshes with a gear 31 on a shaft 32. There is a crank shaft 33 which is provided with a pinion 34 meshing with gear 31. The hopper 35 (Figs. 9 and 10) is kicked up and down or vibrated by a pitman 36 connected to a crank shaft 33 and pivoted to the bottom of the hopper. The forward edge of the hopper is loosely entered under retainers 37 (Fig. 9) secured to the platform, permitting the forward end of the hopper to have up and down play. The hopper is provided with a stepped or riffled agitator 38 which facilitates the feeding of the hay to the space between the feeders on to the platform where it may be moved by the feeders into the receiving chamber of the baling box. To assist in the support and steadying of the hopper, there are provided rockers 39 pivoted to the bottom of the hopper and to the frame 1ª of the machine (Fig. 1). The hopper is continuously vibrated up and down.

Loose on the end of shaft 32 opposite the gear 31 is an operating gear wheel 40 which is made fast to or disengaged from the shaft according to the position of a latch 41 (Fig. 14) which is pivoted to the gear 40 at 42 and is pressed by a spring 43 so that its normal tendency is for its head 44 to engage the clutch wheel 45 fast on the shaft 32 and consisting of spaced disks connected by pins 46 on which are anti-friction rollers 47. The head 44 is adapted to be engaged by one of the rollers 47, thus latching the wheel 40 to the shaft. This latching or release of the wheel is controlled by a trip 48 mounted to slide vertically in a bearing 49 on the frame and suspended by spring 50. The latch is operated by a rod or lever 51 which is fulcrumed at 52 on the frame of the machine and has an end 53 (Figs. 1 and 7) positioned to be engaged by the crank 54 (Fig. 7) of shaft 55 which is journaled in the frame of the machine and extends thereunder, said shaft having a crank arm 56 on its opposite end, the cranks 54 and 56 being connected by rods 57 (Figs. 1 and 6) to the rear cross bar 6 that operates the compressor 5. As shown in Figs. 1, 2, 5, 6, 7, there is a rear crank shaft 58 whose cranks 59 are connected to the compressor 5 by rods 60 secured to the other cross bar 6. As shown in Fig. 7, a shaft 61 extending lengthwise of the machine thereunder is connected by gears 62 to the respective shafts 55 and 58 whereby on turning of the crank shaft 55, the compressor 5 will be operated and during such operation it will engage the end 53 of the rod or lever 51, raising the trip 48 and releasing the latch 41 to permit it to be locked to the shaft 32, thereby causing the operating wheel 40 to turn with the shaft 32 and bring about certain operations which will appear hereinafter. The shaft 29 being continuously driven from the shaft 10 is utilized, through certain mechanism now to be described, to control the operation of the compressor 5 and the gates 3 and 4, as well as the shifting of the cams 20 and the consequent points of their rotation at which the forks 14 will retract, this being necessary both to insure the proper feed of the hay to the receiving chamber during feeding operation, as well as insure the retraction of the forks to prevent feeding of the hay and to avoid interference with the descent of the compressor 5 when the latter is to operate.

Referring to Figs. 1, 4, 14 to 18, the shaft 29 is provided with a clutch 63 of the same form as the clutch 45, etc., of Fig. 14 previously described, and there is loose on said shaft 29 a master wheel 64 to which is pivoted at 65 a latch 66 pressed by a spring 67 and adapted to engage the clutching device 63 when the latch is released. The latch is, however, normally held free of engagement with the clutch 63 by engagement with the head 68 thereof (Figs. 1 and 18) with a laterally extending trip 69 on a longitudinally slidable rod 70 (Figs. 1, 7 and 18) extending along the side of the baling box under the gates 3 and 4 thereof to the expulsion end of the baling box. As shown in Figs. 1 and 18, the trip 69 is urged upwardly by a vertically movable rod 71 whose lower end is loosely seated at 72 in the frame 1ª, said rod being urged upwardly by a spring 73. The mounting of the rod 71 at 72 is such that the rod 71 can swing according to the movement imparted to the rod 70 so that the trip 69 can be withdrawn from the head 68 of the latch 66. At the rear end of the compression chamber is a pressure member or false end 74 (Figs. 2, 4 and 8) which is provided with bolts 75 passing through it and through the end 76 of said receiving chamber and there are springs interposed between the false end 74 and the end 76 whose tension can be regulated by adjusting the nuts 77 (Figs. 2 and 5) so that this pressure member may be tensioned to withstand any desired pressure of the hay in the receiving chamber above the gates 3 and 4 before yielding. Secured to the center of the pressure member is a bolt 78 having adjustable nuts 79 and extending loosely through the end 76. Loose on the projecting end of this bolt is the arm 80 of the rod or bar 70. When the pressure of the hay fed into the receiving chamber above the gates 3 and 4 and below the compressor 5 becomes such that the pressure member 74 yields, the rod or bar 70 is shifted longitudinally and moves the trip 69 (Figs. 1 and 18), thus releasing the head 68 of the latch 66, whereupon the spring 67 causes the said latch to snap into engagement with the continuously rotating clutch 63 and consequently, at that time, the master gear 64 is locked to the shaft 29 and turns with it, thereupon bringing about operations which will subsequently appear.

Referring now more particularly to Figs. 14, 15, 16 and 18, the master gear 64 is provided on its face opposite that carrying the latch 66, with gear segments 81 and 82 and with blank arc-shaped tracks 83 and 84 whose ends terminate where the ends of the gear segments 81 and 82 begin, the tracks 83 and 84 being in substantially the same plane as the gear segments aforesaid, there being omitted or cut-out parts 85 and 86 on the wheel 64 exteriorly of the segments 81 and 82 and between the ends of the tracks 83 and 84.

Secured to a part of the frame 1a is a bearing block 87, Fig. 14. Journaled in this bearing block but entirely disconnected from each other, are shafts 88, 89, and 90. The shaft 88 is provided with a gear which meshes with the gear 23 on the crank shaft 22 and means are thus provided for driving the crank shaft 22, there being a mutilated gear 91 (Figs. 14, 15 and 16) on the shaft 88, the blank parts 92 and 93 of this gear or pinion being located opposite to each other and adapted to permit the passage of the tracks 83 and 84 during rotation of the wheel 64 without turning said gear. The teeth of the gear 91 are adapted to be engaged by the gear segments 81 and 82 so that the shaft 88 and crank shaft 22 are suitably turned during each complete revolution of the master wheel 64 to so shift the cams 20 that the forks of the feeder will be retracted when they are to withdraw from the hay, during the feeding of the hay to the receiving chamber, and the cams 20 are so set and rotated during the downward and upward movements of the compressor 5 that the forks will be retracted during their entire rotation from engagement with the hay and consequently will not feed it to the receiving chamber.

The shaft 89 has a mutilated gear 94 which is of the construction shown in Figs. 15 and 16, being similar to the gear 91. This shaft has a bevel gear 95 meshing with a corresponding gear on a crank shaft 96 which is suitably journaled in bearings 97 at the ends of the machine. The cranks of shaft 96 are connected by links 98 with the gate 4. On the opposite side of the machine there is a rock shaft 99 (Figs. 2 and 6) which is suitably journaled and is connected to the other gate 3. At the delivery end of the press there is a connecting rod 100, Fig. 2, connecting a crank on the shaft 96 with the rock shaft 99. On the shaft 90 there is a gear 101 of the construction shown in Figs. 15 and 16, being similar to the gears 91 and 94 and like them having its mutilated parts adapted to slide against the tracks 83 and 84 without turning the said gear 101 but being adapted to be engaged by the gear segments 81 and 82. As shown in Figs. 1 and 7, gears 102 connect the shafts 90 and 55.

Referring to Fig. 18, there is a leaf spring 103 having a head 104 which is adapted to ride on the periphery of the master wheel 64 or snap into the spaces 85 and 86 and prevent idle turning of the wheel 64. This spring serves as a check to hold the master wheel when the latch 66 is disengaged from the clutch 63 but upon clutching of the master wheel to the shaft 29, the spring is pressed outwardly by the shoulders at the ends of the tracks 83 and 84.

The gates 3 and 4 will remain in their closed position, covering the lower or baling chamber, until the pressure of the hay forced into the receiving chamber becomes such as to move the pressure member 74, whereupon the trip 69 is swung free from the latch 68, whereupon the latch engages the clutch 63, thus locking the master wheel to the shaft 29, whereupon the master wheel turns in the direction of the arrow, Fig. 18. The rotation of the master wheel thereupon brings the gear segment 81 opposite the pinion 94, whereupon the brief engagement of the said segment and pinion cause the gates 3 and 4 to open or separate and thereafter the mutilated part of the gear 94 engages the track 84 which holds it stationary with the gates open. Shortly thereafter the rotation of the master wheel 64 has caused the track 84 to become freed from the pinion or gear 91 which is then engaged by the gear segment 82, thus shifting the cams 20 to such positions that the forks will retract during such parts of their rotation as normally bring them in engagement with the hay and consequently the feed of the hay ceases. The turning of the master wheel thereafter brings the gear segments 81 into engagement with the pinion 101 whereupon the compressor 5 is moved downwardly to force the hay into the baling chamber, the plunger being then in retracted position. A complete revolution of the master wheel 64 having ensued, the gates 3 and 4 have first been opened, the compressor 5 forced downwardly to press the hay into the baling chamber, the gates have been closed and the compressor elevated and the cams 20 shifted and then retracted to first stop feeding of the hay and then resume it. A knife 5× on platform 15 severs the hay so that the descent of compressor 5 is not interfered with. After a repetition of these operations, the crank 54 strikes the end 53 of the trip lever 51 thereupon releasing the trip 48 from the latch 41 which then engages the operating wheel 40 with the shaft 32 and the compression of the hay in the baling chamber, the stoppage of the plunger while the bale is being wired or bound, the operation of the wire baling mechanism occurs, the forward movement of the plunger is resumed, the gate of the baling box is opened and the bale ejected, and the plunger is retracted to normal position, the feeding of the hay into the receiving chamber above the gates 3 and 4 continuing during these operations, as will now appear.

Referring to Figs. 4, 6, 10 and 20, there are two shafts 105 and 106 extending crosswise of the machine at the receiving end and mounted in suitable bearings, the former of which has a pinion 107 meshing with the rack 9 which is connected to the plunger 8. The rack is held on the pinion 107 by a guide roller 108 which is carried by a suitable shaft journaled in the frame-work 1ª. The shaft 105 carries two gears (Fig. 20) 109 and 110, gear 110 being adapted to mesh with the gear segments 111 and 112 of the gear 40, at different times. The shaft 106 has two gears 113 and 114, the latter meshing with the gear 109 and the former being adapted to be turned by a gear segment 115 which is secured to the inner face of gear 40 in offset relation thereto as shown in Figs. 20 and 21 and is provided with fingers 116 and 117 at its ends. The shafts 105 and 106 are driven solely from the gear 40 and through them the gear 107 is turned in one direction or the other and to a greater or lesser degree to accomplish the advance of the plunger in the compression chamber, the stoppage of the plunger while the bale is being wired or bound, the further advance of the plunger on the completion of the wiring or binding of the bale to eject the completed bale, and the return of the plunger to normal retracted position ready for compression of another bale.

Referring to Fig. 14, on the outer face of the gear 40 there is provided a nearly complete circular blank raised track 118. Laterally offset therefrom is the gear segment 119 which is of a length substantially the same as the distance between the ends of the track 118, or, a distance of the break therein. The gear 40 has a relatively long gear segment 111 and on the opposite end of its periphery a shorter gear segment 112, both of which are adapted to mesh, at different times, with the gear 110. The gear segment 115 begins, in slightly overlapped relation, where the gear segment 111 stops and ends at some distance from the terminus of the gear segment 112.

Referring to Figs. 10, 14 and 20, if it be assumed that in Fig. 20 the first tooth of those in the series 111 be starting to engage the pinion 110, the turning of the shaft 105 in the direction of the arrow, will cause a corresponding turning of the gear 107 and consequently the rack 9 will be run into the compression chamber, advancing the plunger and compressing the hay, but when the plunger has reached the position where the bale is suitably compressed and is ready to be bound or wired, the teeth 111 will become disengaged from the pinion 110. The smooth periphery 120 (Fig. 14), will then, on further turning of wheel 40 in the direction of the arrow, block any retrograde movement of the gear 110 and hence the plunger will remain where placed and the binding of the bale will be proceeded with as will presently appear. When the smooth portion 120 has passed the gear 110, the teeth 112 engage the gear 110 and still further advance the plunger which brings about the ejection of the completed bale from the baling chamber. On the disengagement of the teeth 112 from the gear 110, there is a slight pause in the movement of the plunger prior to its retraction. The continued rotation of the wheel 40 brings the teeth 115 into engagement with the pinion 113 which, through the gear 114, and pinion 109, causes a very rapid retraction of the plunger due to the reversal of rotation of the shaft 105. During these compressing, baling, and ejecting operations, the gates 3 and 4 have been closed and the hay has been continuously fed into the receiving chamber so that when the plunger has been retracted the teeth 111, after a brief period of rest, of the plunger in its retracted position, again engage the gear 110 and again force the plunger into the baling chamber to compress the hay but this operation does not occur until the mechanisms hereinafter described have opened the gates 3 and 4, drawn down the compressor 5 and said mechanisms have again resumed their normal positions.

Referring to Figs. 1, 14, 19, 21, there is suitably journaled at one side of the machine a longitudinally extending shaft 121 which operates the complete mechanism for binding or wiring the completed bale. This shaft carries at one end the gear or pinion 122 whose teeth are complete and are adapted to be engaged, for the purpose of turning the shaft 121, and thus operating said mechanism, by the teeth 119, such engagement occurring only when the plunger has been run into the baling chamber to compress and form the bale and during the inaction of the plunger operating mechanism, for it will be observed that the gear segment 119 is placed between the gear segments 111 and 112 which are, respectively, for the purpose of running the plunger into the baling chamber to compress the bale, and, for ejecting the bale. As shown in Figs. 14 and 19, the pinion 122 has an integral disk 123 provided with a flattened portion 124 which is adapted to bear on the track 118 and thus prevent any turning of the shaft 121 during the entire rotation of the gear 40 save when the pinion 122 is engaged by the gear segment 119. Therefore, the binding or wiring mechanism is inoperative except when the pinion is thus engaged.

Referring to Figs. 1, 2, 4 and 8, the shaft 121 carries a controlling wheel 124 which has tracks and gear segments on both sides controlling the operation of all parts of the bale wiring mechanism. On one side, Fig. 8, this wheel is provided with an outer gear segment 125, a nearly complete track 126 whose ends are separated by a space 127; and an inner mutilated track 128 adjacent whose spaced parts or mutilations 129 and 130 are concentric gear segments 131 and 132. On the opposite side or that which faces toward the ejection end of the baling chamber is a segmental gear or rack 133 and concentric therewith is an internal gear segment 134. Offset from the face of the wheel 124 is a disk 135 which has a nearly circular track 136 and concentric therewith and disposed opposite the open part of said track is a gear segment 137.

The plunger 8 is provided on its face which engages the head with transverse channels or grooves 138 and at the ends of the grooves there are disposed pivoted arms 139, carrying groove pulleys 140. All of the arms 139 at each side of the plunger are coupled by the rods 141 and 142 (Fig. 8), there being a coil spring 143 connecting the respective rods together. The action is such that the free ends of the arms are thrown outwardly so that pulleys are disposed toward the sides of the baling chamber. The sides of the baling chamber are provided, as shown in Fig. 1, with longitudinal slots 144 disposed opposite the pulleys 140. The spring 143 by its action on the arms 139 tends to throw the arms outwardly and push the baling wire into the slots 144. At the rear ends of the slots 144 there are pivoted catches 145 (Figs. 1, 2, 3) whose heads pass down through slots 146 in flanges 147 on the side of the baling chamber in such position that these catches are adapted to catch the baling wire and hold it as the hay is being pressed down from the receiving chamber into the baling chamber and thus prevent any interference with the hay.

As shown in Fig. 1, on the side of the compression chamber are located reels or spools 148 which carry the wire 149 that is used in binding or wiring the bale.

Referring more particularly to Figs. 1, 2, 4, 7 and 8, there is a vertical shaft 150 which carries gears 151, corresponding in number with the slots 144 and the pulleys 140. This shaft is turned by bevel gearing 152 which is operated from a shaft 153 carrying a mutilated pinion 154 whose mutilated portion is adapted to ride on the periphery of the disk 135 and whose teeth are adapted to engage the gear segment 133. This pinion 154 is also adapted to be engaged by the internal gear segment 134. The segments 133 and 134 act upon the pinion, one after the other, so that the shaft 153 is first turned one way and then in the other direction, after which it remains stationary for the remainder of the rotation of the controlling wheel 124. Suitably guided in the boxing 155 are the cylindrical needles 156 which have teeth 157 arranged substantially spirally lengthwise thereof and having a twist or pitch in extent about one quarter of the circumference of the needle; that is to say, the teeth begin at the end of the needles and terminate a quadrant's distance from the point where they begin. These teeth mesh with the gear 151 and hence the rotation of the shaft 153 first in one direction and then in the reverse direction, brings about the projection of the needles 156 across the baling chamber and in the grooves of the plunger, the needles being turned a quarter revolution during their advance, thus twisting the wire 149. On their return due to the reversal of the shaft 153 they reverse by turning a quarter revolution on their longitudinal axis. The needles are provided with notches 158 at their inner ends and with holes 159 extending transversely through them and they also have pulleys 160. The wire 149 passes through the holes 159. On the opposite side of the baling chamber are the longitudinally slidable needles 161 having the hooked ends 162 provided with pulleys 163 disposed opposite the slots 144. The needles 161 are shifted back and forth by a bell crank lever 164 which is operated by a crank 165 on a shaft 166 which is disposed underneath the baling chamber and has a mutilated gear 167 which is adapted to be engaged by the gear segment 137 to cause the needles to operate at the proper time. At other times the mutilated part of the gear 167 bears against the track 136 so as to prevent any operation of said needles.

Referring to Figs. 22, 23, 28, 30, 31 twisting wheels 168 are journaled in a boxing 169 and provided with slots 170 adapted to be brought into alinement with slots 171 in said boxing, the slots 171 being in alinement with slots 144. The boxing 169 is mounted on guides 1ᵇ on the baling box and by links 169ᵃ connecting it to a crank 172 on shaft 172 by whose rotation, suitably timed, the entire twisting mechanism is moved away from the side of the baling chamber just prior to the advance of the needles 161 to engage the wires which have been advanced crosswise of the baling chamber by the needles 156. After the needles 161 have hooked the baling wires and drawn them back in the form of a loop, the further rotation of the shaft 172 moves the twisting mechanism back to normal position adjacent the side of the baling chamber, the wires which have been looped by the needles 161 enter slots 170 and 171 and the wheels 168 are turned by shaft 173$^b$ to twist the wires. As shown in Figs. 28, 30, 31, the twisting wheels 168 have gears 168$^a$ which mesh with gears 168$^b$ journaled in boxing 169, one being provided with a sprocket 168$^c$ connected by sprocket chain 173$^a$ to a shaft 173$^b$ which is operated by a bevel gear 173$^c$ on a tubular shaft 173. Shaft 173 extends under the baling box, Figs. 7 and 8, and carries a mutilated pinion 174, Figs. 1, 7, 25, adapted to coöperate with gear segment 125 and track 126.

Referring to Figs. 6, 8, 23, 26 at 175 are a plurality of catches connected by a bar 176 and simultaneously actuated by a spring 177 which is attached to the baling box, said catches being adapted to coöperate with and hold the wires fed by the needles 156 so that the wires cannot be pulled out of position by the needles 161 nor until the needles 156 are retracted.

Referring to Figs. 2, 6, 22, 23, 24, 29, on opposite sides of the twister boxing, but disconnected therefrom, are clamp plates 178 and 179, of similar construction, each having slots 180 in line with slots 144. Pivoted at 181 to the clamp plates, in each instance, are clamps 182, whose hooked ends 183 are adapted to swing across the slots 180 and firmly hold the wires while the twisters are forming the twists therein. In each instance, the clamps, are pivotally connected to a bar 184, so that these clamps will move simultaneously. The bars 184 are connected to cranks 172$^b$, 172$^c$, on shaft 172 by links 185, 186. The relation of the cranks 172$^b$, 172$^c$, to crank 172$^a$ is such that immediately after the twister boxing is moved into position to engage the wires which have been pulled into loops by needles 161, the clamps are engaged with the wires to hold them during the twisting operation and, on its completion, they are released from the wires and the twister withdrawn.

Referring to Figs. 22, 23, 24, 26, 27, secured to the side of the baling box adjacent the inner ends of slots 144 is the boxing 187 of the rotary cutters 188. The boxing has slots 189 whose mouths are in line with slots 144. The slots 189 curve downward and outward and terminate in cutters 190 at which point the wires are severed after twisting. Rotatably mounted in the boxing are cross-shaped or armed cutters 188 which are connected by gears 192 so that they will all rotate with equal speed in the same direction. The arms of the cutters travel adjacent the plates of the boxing 187 and they are thus adapted to both hold the wires against the margins of slots 189 and to sever them by forcing them against cutters 190.

Carried by one of the cutters 188 or one of the gears 192 is a sprocket 193. Parallel to shaft 172 is a shaft 194. A sprocket chain extends around the sprocket 193 and around sprockets on shafts 172 and 194. On shaft 194 is a bevel gear 195 which meshes with a gear 198 on a shaft 199 loose within, and independent of, hollow shaft 173. The opposite end of shaft 199 carries a mutilated pinion 200 which coöperates with track 128 and gear segments 131 and 132.

Referring to Figs. 2 and 3, the baling box is provided with a gate 178$^a$ hinged at 179$^a$ and held by a pivoted latch 180$^a$ which is adapted to be operated by a link 181$^a$ in turn shifted by a crank pin 182$^a$ on the shaft 172. A spring 183$^a$ normally keeps the latch 180$^a$ in such position that it will lock the gate 178$^a$ but when the bale has been completed and wired the rotation of the shaft 172 causes the pin 182$^a$ to shift the link 181$^a$ and release the gate, whereupon the bale may be pushed out by the mechanisms which operate the plunger.

The manner in which the bale is wired and the wire positioned by the plunger for the wiring of the succeeding bale will be clear from the diagrammatic Figs. 32, 33, 34, 35, 36, 37, 38. The needles 156 being in retracted position, the wires 149 are threaded through the holes 159 thereof and engaged with the catches 145, passed across the baling chamber inside of the gate 178$^a$ and brought back along the opposite side of the baling box and tied to any part of the machine. The wires are then in position for the wiring of the first bale. If the machine be started by tripping latch 41 into engagement with the clutch wheel 45, the operation of feeding the hay into the compression chamber and its subsequent delivery into the baling chamber after the gates 3 and 4 have automatically opened and the top or compressor 5 has descended, with subsequent operation of the plunger to compress the bale, the plunger 8 will then be stopped in the position shown in diagrammatic Fig. 32. In this figure the bale is shown at B, ready for wiring and it will be observed that the wires 149 pass around three sides of the bale, lengthwise thereof and in line with the slots 144. The previous engagement of the wires 149 with the catches 145, enables the top or compressor 5 to force the hay down into the baling chamber without deranging the said wires or being interfered with by them. As will presently appear, the wire is subsequently automatically positioned as aforesaid so that on the formation of the next bale there will be no interference between the wires and the hay, and so on. The bale having been formed as aforesaid, the rotation of the wheel 124, through the shafts 150 and 153 causes the needles 156 to pass crosswise of the baling chamber in the rear of the bale B and to travel in the channels (Fig. 24), without interference with the bale and during this operation a part of the wire 149, in each instance, is engaged with the pulleys 140. This operation is shown by Fig. 33. The position of the plunger 8 results in the arms 139 being pressed inwardly by the sides of the baling box. When the needles 156 have passed completely across the baling box and through the ends of the slots 144 on the opposite side thereof, meanwhile turning axially a quadrant's distance to bring the wire 149 lowermost, the continued rotation of wheel 124 causes the gear segment 137 to engage and turn the mutilated gear 167 whereupon, through the connections 164, 165, 166, the needles 161 are made to move toward the needles 156 and this operation continuing, the needles 161 are retracted, whereupon their hooked ends 162, engage the lower stretches of each of the wires 149 and pull the wire into a loop 149$^a$. To enable this loop to be formed, the wire from the reel 148, in each instance, is drawn through the hole 159 in the needle 156. The loops thus formed are first engaged with the catches 175 and are then drawn through the slots 189, the rotary cutters 188 being in position to permit this. The loops are also successively passed through the slots 180 of the respective clamp plates 178 and 179. The position of the parts when thus disposed is shown in Fig. 34. When the loops 149$^a$ are thus formed, the continued turning of the wheel 124 causes the mutilated pinion 200 to engage with one or the other of the gear segments 131, 132 and the shaft 199 having thus been turned its motion is communicated to shaft 194 and from that shaft to shaft 172. The rotation of shaft 172 at this time causes the clamps 182 to clamp the loop and hold it, and thereupon the twister boxing 169 is shifted toward the formed loops and the slots 170, 171 receive the loops and thereupon the twisting wheels 168 are turned by the engagement of the pinion 174 with the gear segment 125. Meanwhile the rotation of shaft 194 causes rotation of sprocket 193, turning the armed cutters 188 a partial rotation, causing an arm of each of them to bind the wire 149, and loop 149$^a$ against the margins of slots 189. The cutters remain idle until the loop has been twisted around the wire 149 to complete the bale tie, but upon the completion of the twisting operation and the retreat of the twister boxing 169, the ends of the wire forming the completed bale tie are severed by the cutter 188 and at the same time the free end of the wire 149 coming from the reel 148 is held by an arm of the cutter forcing it against the margin of the slot 189, as shown at 149$^b$. This condition is illustrated in the diagrammatic Fig. 35. The mechanisms continuing their cycle of operation, the needles 156 are first withdrawn and remain stationary but in withdrawing there is a stretch of wire 149$^c$ drawn across the plunger, in each instance, the said stretches lying within the channels of the plunger and being entirely disconnected from the bale B. This condition is illustrated in the diagrammatic Fig. 36. The cycle of operations continuing, the plunger 8 advances, forcing the completed bale B from the baling chamber, the gate 178$^a$ being unlatched by the rotation of shaft 172 and the wired bale is ejected. The position of the parts is then shown in the diagrammatic Fig. 38, from which it will be seen that the advance of the plunger 8 forces the stretches of wire 149$^c$ to the rear of the baling box, during which movement the arms 139 and the pulleys thereon are thrown outwardly by the spring 143 and thus force the wires into the slots 144 so that they are made to engage with the catches 145, and consequently on the retreat of the plunger the wires will remain caught, said operation being an automatic one. The forcing of the wires outwardly into the slots 144 is shown by diagrammatic Fig. 37. On the ejection of a completed and wired bale, the plunger retreats to the receiving end of the baling chamber and the door 178$^a$ closes by gravity and is automatically latched. The cycle of operations continuing, the receiving chamber is filled, the gates 3 and 4 opened, the compressor or top 5 forced down, the foregoing parts restored to normal position, and the plunger run forward in the baling box to form another bale which is then wired and ejected as previously set forth.

The twist formed by the twisting, clamping, and severing mechanism is shown in detail in Fig. 39.

Having thus described my invention what I claim as new and desire to secure by Letters Patent, is:—

1. In a baling machine, the combination of compression and receiving chambers arranged in superposed relation, a gate adapted to close communication between said chambers, a baling plunger operating in the compression chamber, and a compressor extending the full length of the receiving chamber and operating therein which is adapted to force the material from the receiving chamber into the compression chamber for subsequent compression by the baling plunger.

2. In a baling machine, the combination of compression and receiving chambers arranged in superposed relation and both of substantially the same length, a gate which closes communication between the said chambers and extends the full length thereof, a baling plunger operatable in the compression chamber below the gate, and a compressor extending the full length of the receiving chamber and operating therein which is adapted to force the material from the receiving chamber into the compression chamber for subsequent compression by the baling plunger.

3. In a baling machine, the combination with compression and receiving chambers, of a gate controlling communication between them, a baling plunger operating in the compression chamber, a feeder adapted to deliver the material to the receiving chamber, a compressor operating in the receiving chamber adapted to force the material therefrom into the compression chamber for subsequent compression and baling by the plunger, and automatically acting mechanism coöperating with the plunger, gate, and compressor adapted to open the gate when a suitable quantity of material has been received in the receiving chamber, to thereupon operate the compressor to force the material into the compression chamber and to restore the gate and compressor to normal position and thereupon to operate the plunger to form the bale.

4. In a baling machine, the combination with compression and receiving chambers, of a gate controlling communication between them, a baling plunger operating in the compression chamber, a feeder adapted to deliver the material to the receiving chamber, a compressor operating in the receiving chamber adapted to force the material therefrom into the compression chamber for subsequent compression and baling by the plunger, and automatically acting mechanism coöperating with the plunger, gate, and compressor adapted to open the gate when a suitable quantity of material has been received in the receiving chamber, to thereupon operate the compressor to force the material into the compression chamber and to restore the gate and compressor to normal position and thereupon to operate the plunger to form the bale, together with an automatic feeder for delivering the material to the receiving chamber and operating mechanism for said feeder which renders said feeder inoperative to feed the material when the gate is open and the compressor is forcing the material from the receiving chamber into the compression chamber.

5. In a baling machine, the combination with a compression chamber, of a receiving chamber, said chambers being in communication, a gate controlling communication between the respective chambers, means for forcing the material from the receiving chamber into the compression chamber, a baling plunger operating in the compression chamber, and mechanism controlled by the pressure of the material in the receiving chamber which is adapted to open the gate, operate the compressor, and operate the plunger after the material has been forced by the compressor into the compression chamber.

6. In a baling machine, the combination with a compression chamber, of a receiving chamber, said chambers being in communication, a gate controlling communication between the respective chambers, means for forcing the material from the receiving chamber into the compression chamber, a baling plunger operating in the compression chamber, feeding mechanism for forcing the material into the receiving chamber, and mechanism operated by the pressure of the material in the receiving chamber due to the positive feeding of the material to said chamber, for opening the gate when the pressure is sufficiently high and thereupon operating the compressor to force the material from the receiving chamber into the compression chamber, said mechanism being adapted to cut off the feed into the receiving chamber and to operate the baling plunger.

7. In a baling machine, a feeder having rotarily mounted retractable forks, in combination with means for rotating said forks, and means for regulating the point of their rotation at which the forks retract.

8. In a baling machine, a feeder having rotatable pivotally mounted forks, springs adapted to actuate the forks in one direction, a cam adapted to coöperate with the forks to actuate them in opposition to the springs at a certain part of their rotation, whereby they are all alternately projected and retracted, and means for shifting or setting the cam to control the point of rotation of the forks at which they project and retract.

9. In a baling machine, the combination with a receiving chamber and a compression chamber in communication with each other, of a plunger operating in the compression chamber, means for forcing the material from the receiving chamber into the compression chamber, a rotary feeder having projectable and retractable forks, means for projecting and retracting said forks at certain points of their rotation whereby the material is fed by the forks into the receiving chamber, means for operating the material forcing device when a sufficient quantity of the material has been fed into the receiving chamber, means for changing the point of retraction of the forks of the feeder when the material has been thus forced into the compression chamber, and means for operating the plunger.

10. In a baling machine, the combination with a compression or baling chamber, of a plunger operable therein, and operating means for said plunger adapted to advance the plunger to compress or form the bale, retain the plunger while the bale is being bound, again advance the plunger to eject the bale, and finally to retract the plunger.

11. In a baling machine, the combination with a compression or baling chamber, of a plunger operative therein and operating means for said plunger embodying an operating gear, means for turning said gear in the same direction, and gearing interposed between the operating gear and the plunger by which the rotation of the operating gear in the same direction is made to advance the plunger to compress or form the bale, retain the plunger while the bale is being bound, again advance the plunger to eject the bale, and finally to retract the plunger.

12. In a baling machine, the combination with a compression or baling chamber, of a plunger operative therein and operating means for said plunger embodying an operating gear, means for turning said gear in the same direction, and gearing interposed between the operating gear and the plunger by which the rotation of the gearing in the same direction is made to advance the plunger to compress or form the bale, retain the plunger while the bale is being bound, again advance the plunger to eject the bale, and finally to retract the plunger, in combination with bale binding or wiring mechanism coöperatively related to the operating gear aforesaid and adapted to be operated thereby when the bale has been formed and the plunger is stationary.

13. In a baling machine, the combination with a compression or baling chamber, of a plunger operating therein, a shaft, gearing interposed between the shaft and the plunger whereby the latter may advance or retreat in the baling chamber, gears carried by said shaft, and an operating gear adapted to turn in the same direction which is provided with independent gear segments adapted to coöperate with the gears on the shaft aforesaid to convert the rotation of the operating gear into an advance movement of the plunger to compress the bale, the retention of the plunger in stationary position while the bale is being bound or wired, the subsequent advance of the plunger to eject the bale from the chamber, and the retraction of the plunger thereafter for the subsequent compression of another bale.

14. In a baling machine, the combination with a compression or baling chamber, of a plunger operatable therein, a shaft continuously driven in a given direction, an operating gear, a clutch adapted to engage the operating gear with the shaft or to release it therefrom, a clutch controlling device, mechanism interposed between the operating gear and the plunger adapted for advancing the plunger to compress or form the bale, subsequently to eject the bale and finally to retract the plunger, means for pressing or forcing material into the baling chamber for subsequent compression by the plunger, said mechanism being adapted to control the clutch controlling device, whereby the operating gear is clutched to the shaft and the plunger is caused to operate when a sufficient quantity of the material is in the baling chamber and said operating gear is disengaged from the shaft when the material is being fed to the baling chamber.

15. In a baling machine, the combination with a compression chamber, of a plunger operatable therein, a shaft continuously driven in a given direction, an operating gear, a clutch adapted to engage the operating gear with the shaft or to release it therefrom, a clutch controlling device, mechanism interposed between the operating gear and the plunger adapted for advancing the plunger to compress or form the bale, subsequently to eject the bale and finally to retract the plunger, a receiving chamber in communication with the baling chamber, a gate or cut-off interposed between the respective chambers, a compressor operating in the receiving chamber adapted to force the material therefrom into the baling chamber when the gate is opened and prior to the advance of the plunger, operating mechanism for said compressor, operating mechanism for the gate, both timed to open the gate and force the material into the baling chamber when the plunger is retracted, said operating mechanism controlling the aforesaid clutch so that the operating gear will not advance the plunger when the compressor is forcing the material into the baling chamber.

16. In a baling machine, the combination with a baling box or chamber, of a plunger operable therein, needles operating crosswise of the baling box or chamber, needles operating longitudinally thereof, wire twisting and cutting mechanism, wire catches on the bailing box, and devices on the plunger adapted to insure the engagement of the wire with the catches aforesaid.

17. In a baling machine, the combination with a baling box or chamber provided with longitudinal slots, of catches disposed adjacent the slots, a plunger operating in the baling box or chamber, devices on the plunger adapted to poke the baling wire into the slots and to cause it to engage with the catches, and needles, twisters and cutters adapted to coöperate with the baling wire.

18. In a baling machine, the combination with a baling box or chamber having longitudinal slots, of catches disposed adjacent the slots, a plunger movable in the baling box or chamber, spring actuated arms carried by the plunger which are adapted to project into the slots and to poke the baling wire into them so that it will be caught by the catches, needles, twisters, and cutting mechanism adapted to coöperate with the baling wire.

19. In a baling machine, the combination with a baling box or chamber having longitudinally extending slots, of catches disposed adjacent said slots and adapted to engage the baling wire, of baling chamber operating in said box and provided with grooves or channels in its face, spring actuated arms carried by the plunger and disposed, respectively, in line with the grooves or channels and with the slots in the box so that they will be adapted to poke the wire into the slots and insure its being caught by the catches, and wiring mechanism comprising, in part, needles adapted to operate crosswise of the baling box and disposed to travel in the grooves or channels of the plunger, and means for imparting a turn or twist to said needles when they operate.

20. In a baling machine, the combination with a baling box or chamber having longitudinally extending slots, of catches disposed adjacent said slots and adapted to engage the baling wire, of a baling plunger in said box and provided with grooves or channels in its face, spring-actuated arms carried by the plunger and disposed, respectively, in line with the grooves or channels and with the slots in the box so that they will be adapted to poke the wire into the slots and insure its being caught by the catches, wiring mechanism comprising, in part, needles adapted to operate crosswise of the baling box and disposed to travel in the grooves or channels of the plunger, means for imparting a turn or twist to said needles when they operate, catch mechanism adapted to hold the wire engaged by the needles aforesaid, twisting mechanism, and other needles operating lengthwise of the baling chamber.

21. In a baling machine, the combination with a baling box, of a plunger adapted to operate therein, needles adapted to operate crosswise of the baling box, wire fastener means to hold the wire carried across the baling box by the needles, means for severing the wire, and devices adapted to hold the wire at the advance end of the bale.

22. In a baling machine, the combination with a baling box, of a plunger adapted to operate therein, needles adapted to operate crosswise of the baling box, wire fastener means to hold the wire carried across the baling box by the needles, means for severing the wire, devices adapted to hold the wire at the advance end of the bale, and means on the plunger for causing the wire to engage the holding devices when expelling a wired bale from the baling box so that the wire will be held in position to bind the advance end of a succeeding bale.

23. In a baling machine, the combination with a baling box having slots, of wire holding devices adjacent said slots, a baling plunger, and means operated by the plunger adapted to poke the baling wire into the slots so that the wire holding devices will engage it.

24. In a baling machine, the combination with a baling box having slots, of wire holding devices adjacent thereto, a baling plunger, and spring-actuated devices carried by the plunger adapted to force the baling wire into the slots in position to be engaged by the holding devices when the plunger is expelling a previously formed bale.

25. In a baling machine, the combination with a baling box, of wire or bale tying mechanism comprising, in part, needles adapted to operate crosswise of the baling box, loop forming needles adapted to engage and loop the wire after it has been carried across the baling box by the needles first-named, means for twisting the looped parts of the wire, and means for severing the wire.

26. In a baling machine, the combination with a baling box, of a plunger operable therein, means for passing wire across the baling box in front of the plunger, means for twisting the wire to form a bale tie, means for severing the completed bale tie from the wire and catching the loose wire end so that on the return of the crosswise operating wire-passing means aforesaid a stretch of the wire will remain in front of the plunger, and means for catching and holding the wire stretch aforesaid when the plunger ejects the previously formed and wired bale to thereby hold the wire for the subsequent wiring of the succeeding bale.

In testimony whereof, I hereunto affix my signature in presence of two witnesses.

ROY A. COLLINS.

Witnesses:
V. HEMPHILL,
E. M. TERRY.